United States Patent [19]
Fuji et al.

[11] Patent Number: 5,365,501
[45] Date of Patent: Nov. 15, 1994

[54] INFORMATION RECORDING AND REPRODUCING DEVICE

[75] Inventors: Hiroshi Fuji; Takeshi Yamaguchi; Toshihisa Deguchi, all of Nara, Japan

[73] Assignee: Sharp Kabushiki Kaisha, Osaka, Japan

[21] Appl. No.: 853,863

[22] Filed: Mar. 20, 1992

Related U.S. Application Data

[63] Continuation of Ser. No. 555,569, Jul. 20, 1990, abandoned.

[30] Foreign Application Priority Data

Jul. 21, 1989 [JP] Japan ................. 1-189640

[51] Int. Cl.$^5$ ............................................. G11B 17/32
[52] U.S. Cl. ...................................... 369/13; 369/47
[58] Field of Search ................. 369/13, 32, 33, 44.26, 369/44.31, 44.29, 47, 48; 360/59, 114; 365/122

[56] References Cited

U.S. PATENT DOCUMENTS

| | | | |
|---|---|---|---|
| 3,693,098 | 9/1972 | Sevilla . | |
| 4,375,088 | 2/1983 | de Haan | 369/275.3 |
| 4,674,071 | 6/1987 | Okumura et al. . | |
| 4,736,352 | 4/1988 | Satoh et al. | 369/275.3 |
| 4,761,775 | 8/1988 | Murakami | 369/275.3 |
| 4,802,159 | 1/1989 | Nagai | 369/275.3 |
| 4,821,252 | 4/1989 | Nishimiya et al. . | |
| 4,831,609 | 5/1989 | Suzuki | 369/44.26 |
| 4,884,259 | 11/1989 | Horikawa | 369/44.26 |
| 4,949,325 | 8/1990 | Tsuyoshi et al. . | |
| 4,967,403 | 10/1990 | Ogawa | 369/275.3 |
| 5,001,695 | 3/1991 | Tominaga | 369/44.26 |
| 5,038,339 | 8/1991 | Pasman et al. | 369/275.3 |

FOREIGN PATENT DOCUMENTS

| | | |
|---|---|---|
| 0189187 | 7/1986 | European Pat. Off. . |
| 0232867 | 8/1987 | European Pat. Off. . |
| 0245821 | 11/1987 | European Pat. Off. ......... 369/44.26 |
| 0278006 | 8/1988 | European Pat. Off. . |
| 0278006 | 8/1988 | European Pat. Off. . |
| 2508218 | 12/1982 | France ........................ 369/44.26 |
| 3434418 | 3/1985 | Germany . |
| 3739384 | 6/1988 | Germany . |
| 3809223 | 10/1988 | Germany . |
| 6363134 | 3/1983 | Japan . |
| 0057634 | 4/1983 | Japan ............................ 369/44.26 |
| 0094247 | 5/1984 | Japan ............................ 369/44.26 |
| 62-204469 | 9/1987 | Japan . |
| 8801092 | 2/1988 | Japan ............................ 369/44.26 |
| 64-1167 | 1/1989 | Japan . |

*Primary Examiner*—Robert J. Pascal
*Assistant Examiner*—Tan Dinh

[57] ABSTRACT

An information recording and reproducing device records, erases and reproduces information on and from a memory device. The memory device has pre-format sections. The information recording and reproducing device includes a pre-recorded area detection circuit for detecting a pre-recorded area having information predeterminately recorded and located on the memory device and timing control circuits for providing timing control of an information recording, erasing or reproducing operation according to a pre-recorded area detecting signal released from the pre-recorded area detection circuit, thereby enabling each timing of recording, reproducing, or erasing operation is accurately determined. The timing control may be performed according to both of the pre-recorded area detecting signal of the present invention and the conventional synchronization detection signal. In that case, if an error should occur in the synchronization detection signals, since the pre-recorded area detecting signal is released every time pre-recorded information for a sector mark or the like is reproduced, an accurate timing control without time lag is achieved according to the pre-recorded area detecting signals.

9 Claims, 13 Drawing Sheets

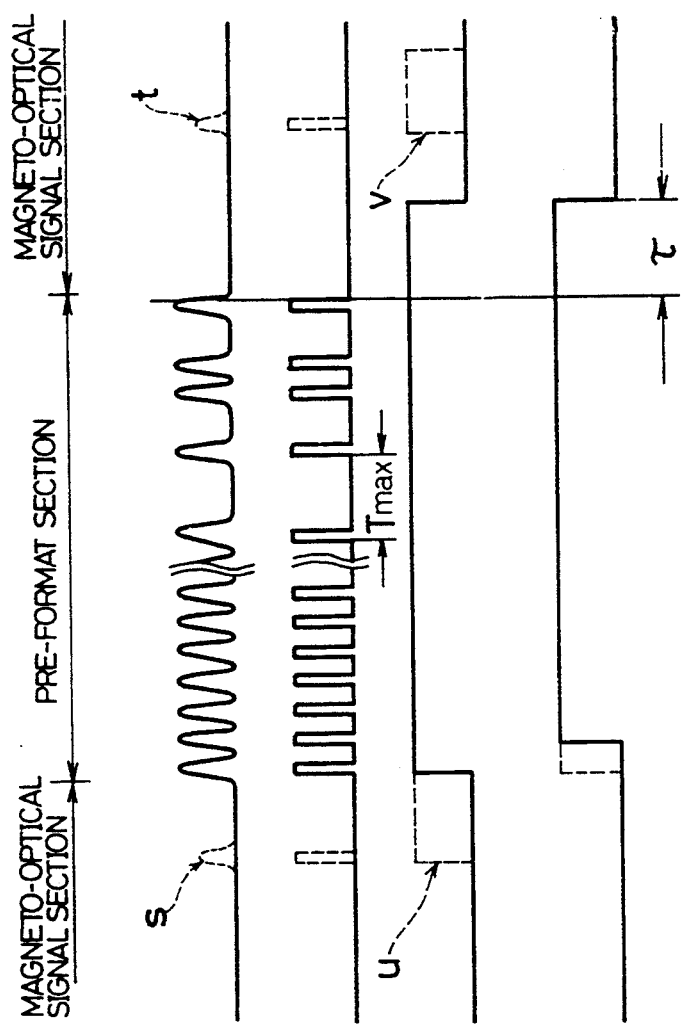

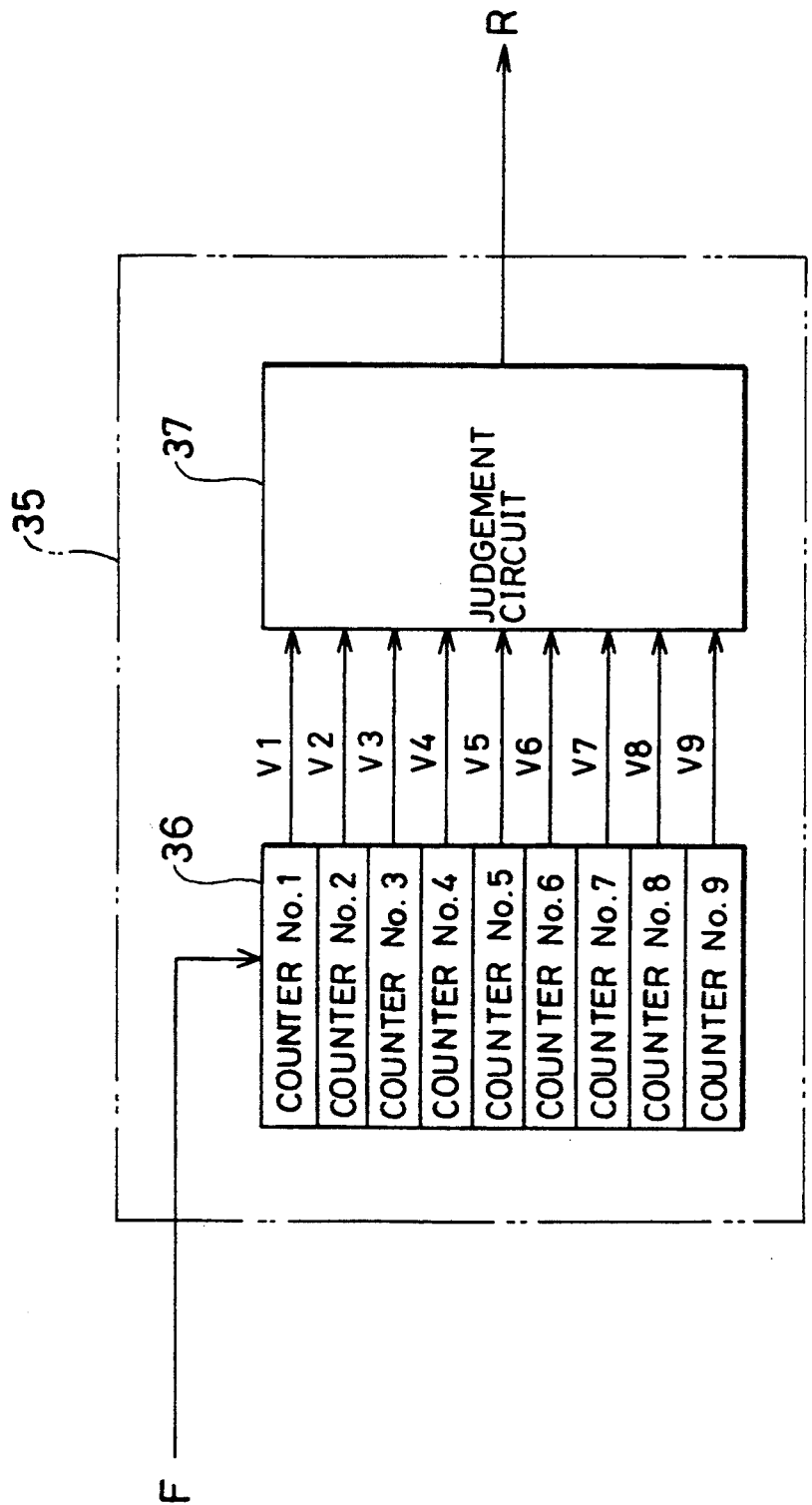

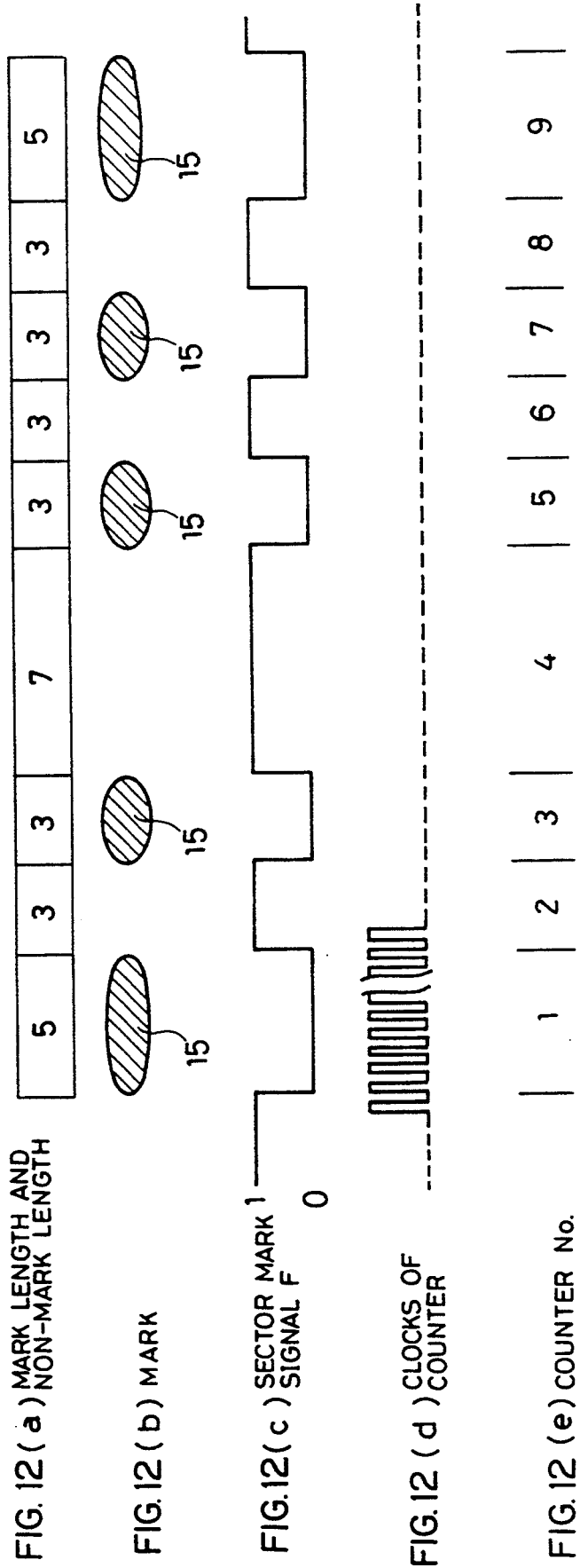

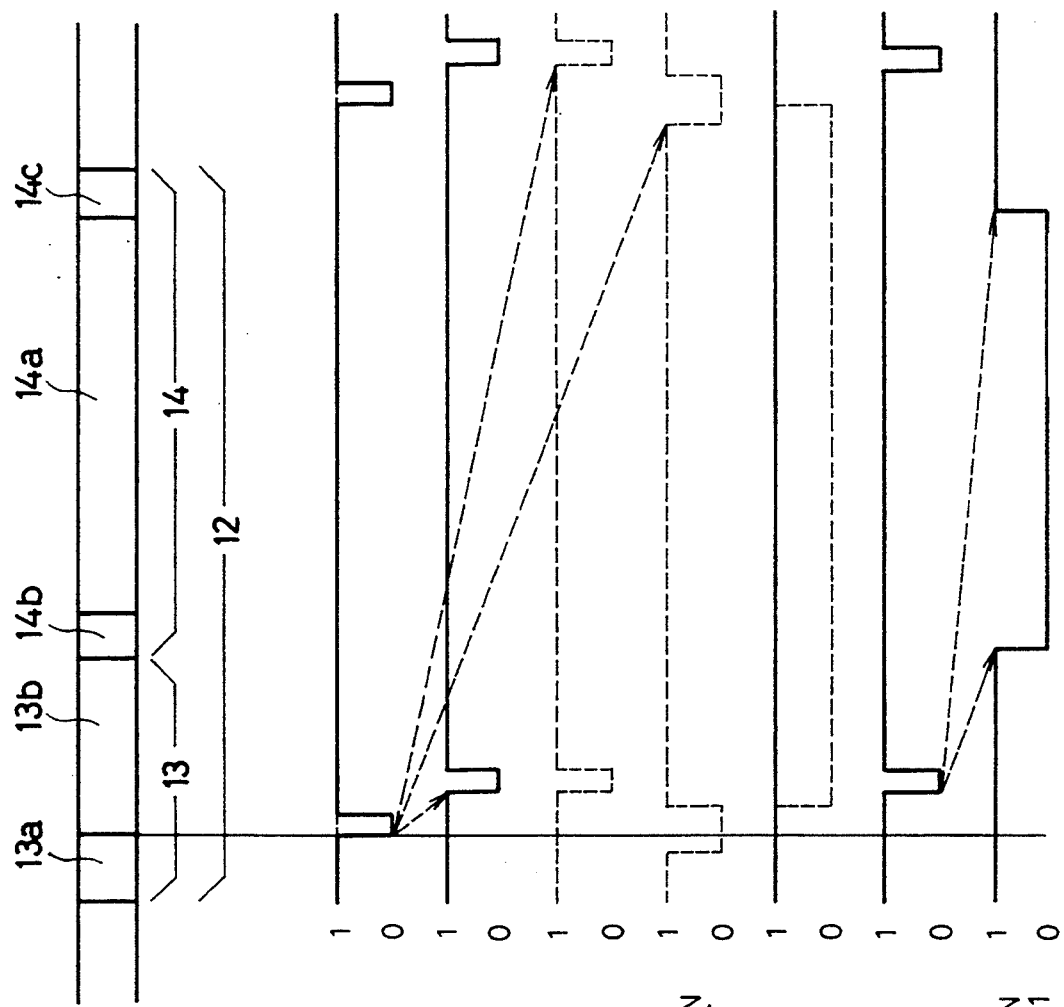

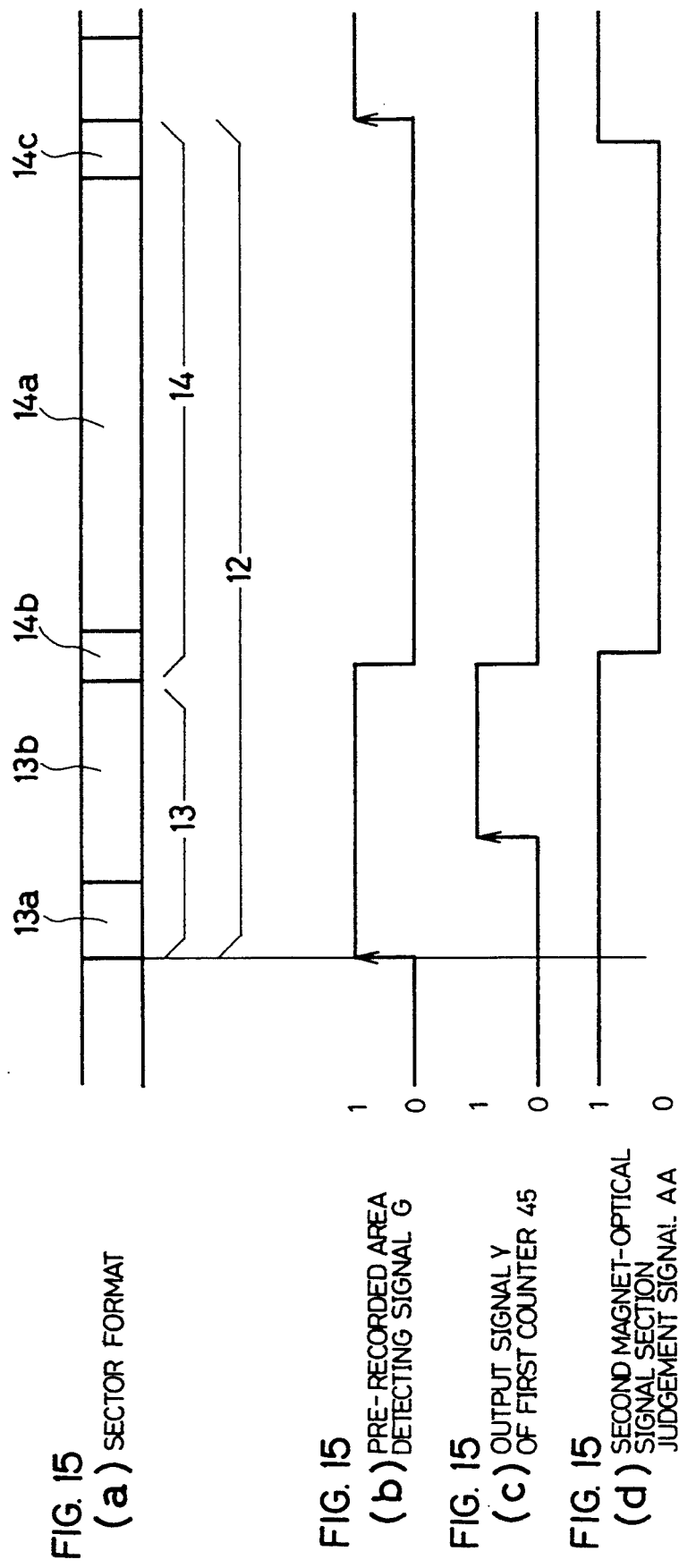

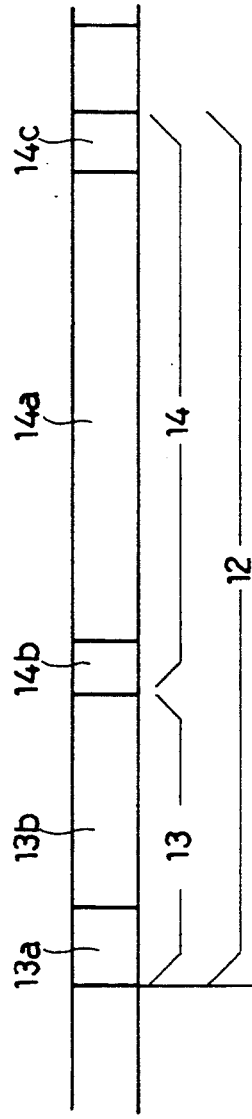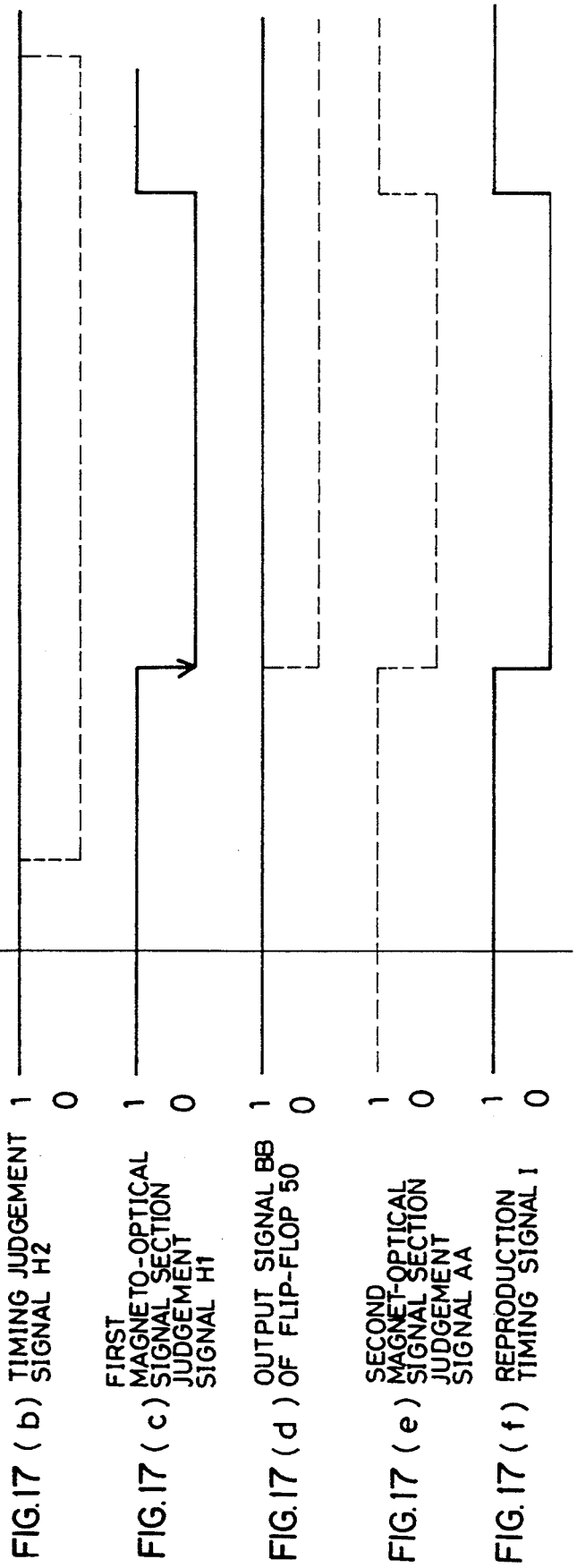

INFORMATION RECORDING AND REPRODUCING DEVICE

This application is a continuation, of application Ser. No. 07/555,569 filed on Jul. 20, 1990, now abandoned.

FIELD OF THE INVENTION

The present invention relates to an information recording and reproducing device for recording and reproducing information on and from a memory device of various kinds such as a magneto-optical disk. Pieces of information such as address information are previously and permanently recorded. More specifically, the present invention is related to timing control of information recording and reproduction.

BACKGROUND OF THE INVENTION

On a magneto-optical disk, a thin magnetic film having vertical magnetic anisotropy is usually used as a recording medium, and a laser beam which is converged to a spot of substantial 1 μm is applied thereto in order to perform recording, reproducing and erasing operations. More concretely, the recording and erasing operations are achieved by effecting magnetization reversal by an external magnetic field by utilizing the fact that coercive force becomes lowered due to a temperature rise in the spot where the laser beam is focused. On the other hand, the reproducing operation is achieved by utilizing the fact that a plane of polarization of the laser beam rotates by magneto-optical effect and detecting a rotation of the polarizing plane by an analyzer.

An arrangement has been suggested wherein each track of the magneto-optical disk is divided into a plurality of sectors in the circumferential direction, and in the leading area of each sector, a pre-format part is disposed, wherein a sector mark, address information and other data are preformed in pits, while recording, reproducing and erasing operations of magneto-optical signals are performed in the other area of each sector as a recording area for magneto-optical signals by every sector unit. In that case, it is necessary to provide timing control so that recording, reproducing and erasing operations can be performed in the recording area for magneto-optical signals except the pre-format part.

In FIG. 21, there is illustrated a conventional information recording and reproducing device for performing recording and reproducing operations on and from a magneto-optical disk by the use of the above-mentioned method. A reproduced signal A is released from an information reproducing circuit 1, and the reproduced signal A is inputted to a synchronization detection circuit 2. In the synchronization detection circuit 2, synchronization detection for each sector is performed from, for example, a signal of a sector mark which is a part of the reproduced signal A.

A synchronization detection signal B released from the synchronization detection circuit 2 is inputted to a timing control circuit 3, where timing control is provided according to the synchronization detection signal B, and consequently, a reproducing timing signal C is sent to the information reproducing circuit 1 during a reproducing operation, while a recording/erasing timing signal E is sent to an information recording/erasing circuit 4 during a recording or erasing operation. With the above arrangement, recording, reproducing and erasing operations are performed in the recording area for magneto-optical signals of each sector. Additionally, the synchronization detection by the synchronization detection circuit 2 is performed separately from the reproducing operation of information so as not to disturb the synchronization detection due to the reproducing timing signal C.

However, in the device shown in FIG. 21, since the timing control is provided only by the use of the synchronization detection, there sometimes arises a situation wherein an error occurs in synchronization detection or time lag in detection occurs in the synchronization detection circuit 2, and consequently an accurate timing control cannot be executed. More specifically, errors in the timing control arise because reed gate signals of a PLL (Phase Locked Loop) included in the information reproducing circuit 1 become inaccurate, pulling-in operation cannot be performed, or the runout of the locked loop is apt to occur. Accordingly, the conventional method has a problem in that reliability of recording, reproducing and erasing operations cannot be fully achieved. Further, when an error occurs in synchronization detection, timing control of AGC (Automatic Gain Control) is adversely affected.

SUMMARY OF THE INVENTION

It is an object of the present invention to provide timing control for accurate recording and reproducing operations without time lag if an error should occur in synchronization detection signals.

In order to achieve the above object, an information recording and reproducing device of the present invention, which records and reproduces information on and from a memory device, comprises a pre-recorded area detection circuit for detecting a pre-recorded area having information prerecorded recorded and located on the memory device, and timing control means for providing timing control of an information recording or reproducing operation according to pre-recorded area detecting signal released from the pre-recorded area detection circuit.

As aforementioned, in the present invention, since the timing control of information recording, reproducing and erasing operations is provided according to the pre-recorded area detecting signal, timing of recording, reproducing, or erasing operation is accurately determined.

Additionally, the timing control may be performed according to both of the pre-recorded area detecting signal of the present invention and the conventional synchronization detection signal. In that case, if all error should occur in the synchronization detection signals, since the pre-recorded area detecting signal is released every time pre-recorded information for a sector mark or the like is reproduced, an accurate timing control without time lag is achieved according to the pre-recorded area detecting signal. For a fuller understanding of the nature and advantages of the invention, reference should be made to the ensuing detailed description taken in conjunction with the accompanying drawings.

BRIEF DESCRIPTION OF THE DRAWINGS

FIGS. 1 to 20 show one embodiment of the present invention.

FIGS. 1(a) 4 to (d) are time charts showing a generating sequence of pre-recorded area detecting signals.

FIG. 2 is a schematic plan view showing magneto-optical disk.

FIG. 3 is an enlarged partial view of FIG. 2.

FIG. 4 is a block diagram showing an information recording and reproducing device.

FIG. 5 is a block diagram showing an information reproducing circuit.

FIGS. 6 to 8 are explanatory diagrams respectively showing examples of a re-triggerable pulse generation circuit.

FIG. 9 is a block diagram showing a detailed arrangement of an information reproducing circuit.

FIG. 10 is a block diagram showing a detailed arrangement of a synchronization detection circuit.

FIG. 11 is a block diagram showing a detailed arrangement of a sector mark detection circuit.

FIGS. 12(a) 5 to (e) are explanatory diagrams showing the operation of a counter circuit.

FIG. 13(a–n) 8 is a time chart showing the progress of each signal in the synchronization detection circuit.

FIG. 14 is a block diagram showing a detailed arrangement of a timing control circuit.

FIGS. 15(a–d) 4 is a time chart showing the progress of each signal in the timing control circuit.

FIG. 16 is a circuit diagram showing a detailed configuration of a switching circuit.

FIGS. 17(a–f) 10 is a time chart showing the progress of each signal in the switching circuit.

FIGS. 18 to 20 show another embodiment of the present invention.

FIG. 18 is a block diagram showing an information reproducing circuit.

FIGS. 19 and 20 are explanatory diagrams showing examples of a pre-recorded area detection circuit.

DESCRIPTION OF THE EMBODIMENTS

The following description will discuss one embodiment of the present invention referring to FIGS. 1 to 17.

Figure 2:
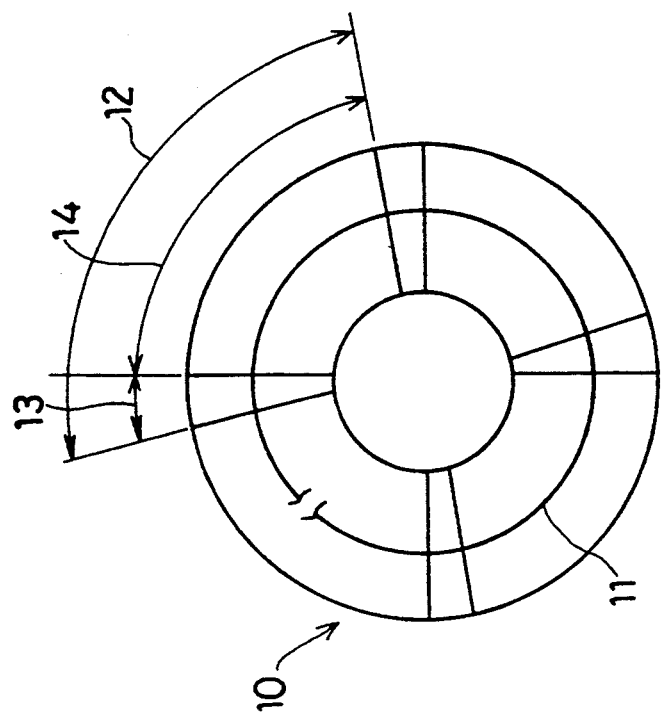

In FIG. 2, there is shown a magneto-optical disk 10 as an example of an optical memory device on/from which recording, reproducing or erasing operations are executed by an information recording and reproducing device according to the present invention. On the magneto-optical disk 10, there are provided tracks 11 in a spiral shape, or in a concentric shape, and each track 11 is divided into a plurality of sectors 12 in the circumferential direction. A pre-format section 13 is disposed in a leading area of each sector 12, and the remaining area thereof forms a magneto-optical signal section 14.

Figure 3:
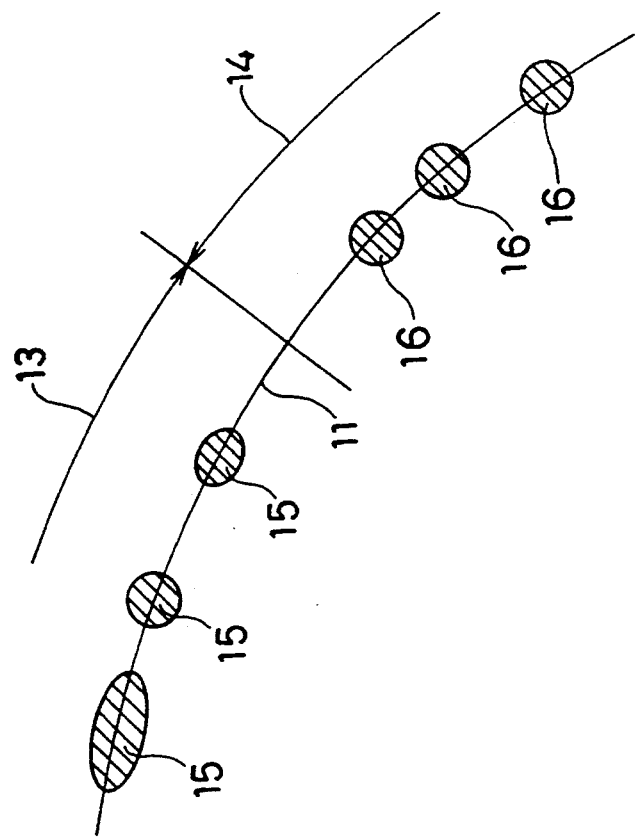

As shown in FIG. 3, in the pre-format section 13, there are prerecorded a plurality of marks 15 (shown in hatching for convenience) formed in pits and non-marks which are space sections between those marks and in the magneto-optical signal section 14, there are recorded a plurality of marks 16 (shown in hatching for convenience) formed by magneto-optical signals and non-marks which are space sections between those marks 16. The marks 15 are preformed physically, and therefore are not erasable; however, the marks 16 are recordable as well as erasable. Additionally, either each mark 15, 16 or each non-mark located in between corresponds to a signal "1", and the remaining corresponds to a signal "0".

FIG. 13(a) shows a sector format which is a format of each sector 12. The pre-format section 13 includes a sector mark section 13a for synchronizing each of the sectors 12 and an ID section 13b having address information of the sectors 12.

On the other hand, the magneto-optical signal section 14 includes a data section 14a for recording magneto-optical signals therein and gap sections 14b, 14c. Basically, data is recorded in the data section 14a by using marks 16 and non-marks given by magneto-optical signals. The gap sections 14b, 14c are margin sections for allowing a recording start position and a recording end position to be dislocated forward or backward by phase errors which occur when synchronizing each of the sectors 12 to the rotation of a spindle motor for rotating the magneto-optical disk 10.

Figure 4:
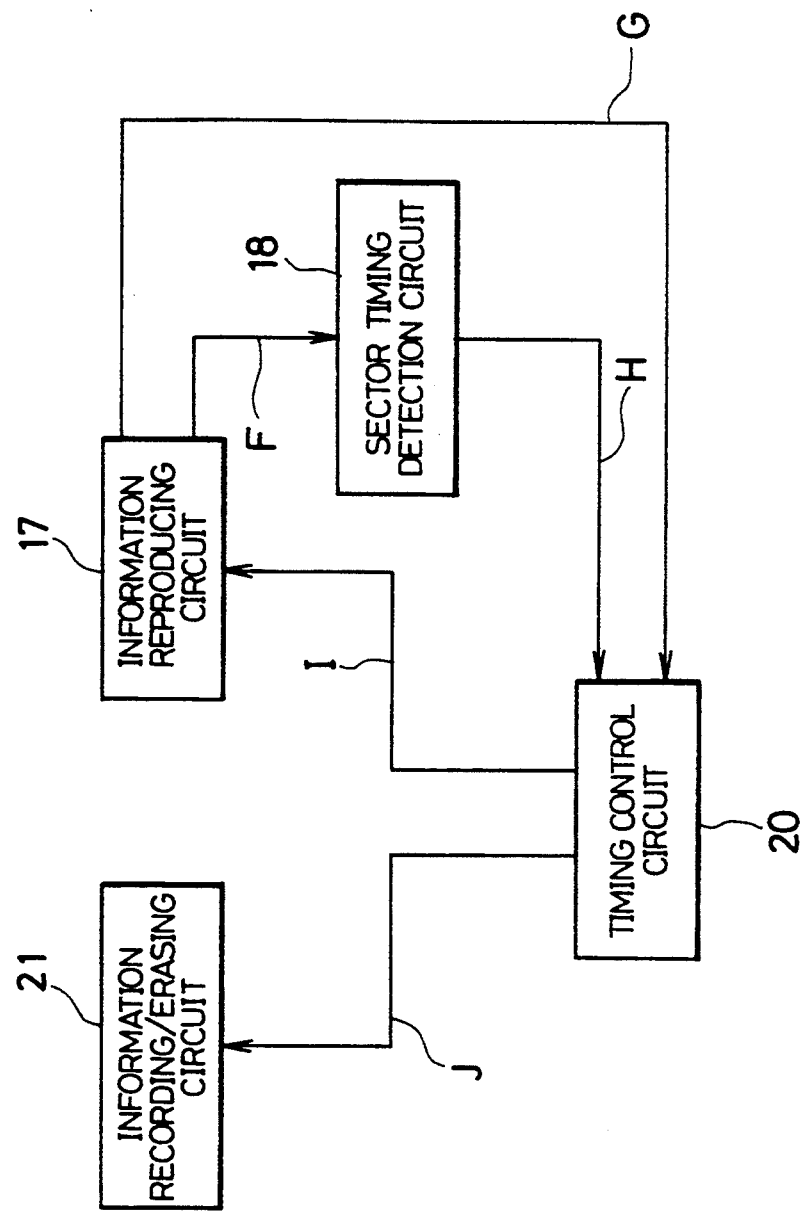

As shown in FIG. 4, the information recording and reproducing device of the present invention comprises an information reproducing circuit 17 (information reproducing means), and from the information reproducing circuit 17, reproducing signals including a sector mark signal F are sent to a sector timing detection circuit 18, as will be described later.

Furthermore, from the information reproducing circuit 17, a pre-recorded area detecting signal G (which will be described in detail later) is sent to a timing control circuit 20 as a timing control means, while a synchronization detection signal H, which will be described in detail later, generated in the sector timing detection circuit 18 according to the sector mark signal F is also sent to the timing control circuit 20. According to those signals, from the timing control circuit 20, a reproduction timing signal I is released to the information reproducing circuit 17, and a recording/erasing timing signal J is also released to an information recording/erasing circuit 21.

Figure 5:
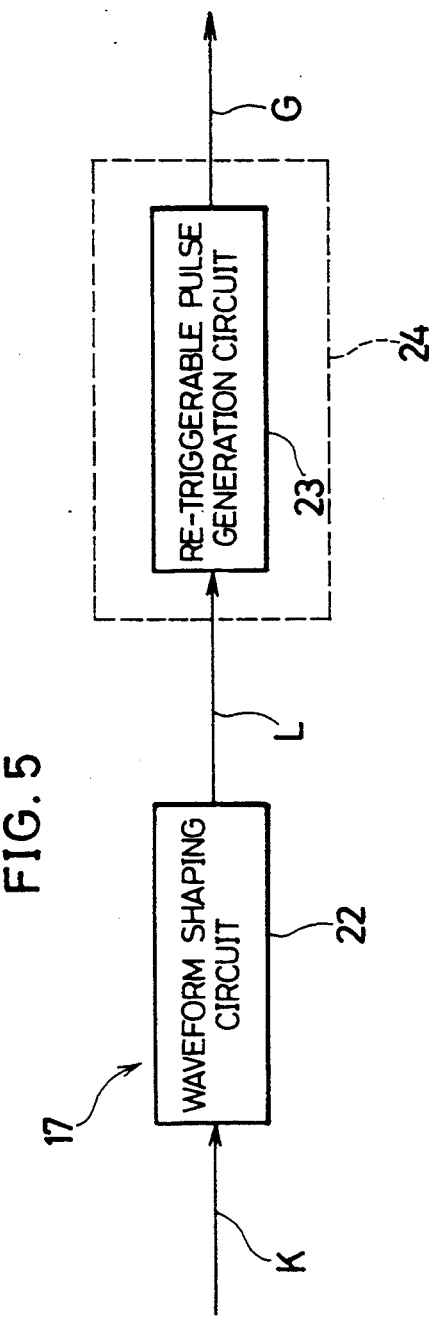

As shown in FIG. 5, the information reproducing circuit 17 comprises a pre-recorded area detection circuit 24 including a waveform shaping circuit 22 and a re-triggerable pulse generation circuit 23, and is designed to detect the pre-format sections 13 as a pre-recorded area having a sector mark and the like recorded therein.

More specifically, a reproduced analog signal K (see FIG. 1(a)) reproduced from the pre-format section 13 of the magneto-optical disk 10 is entered to the waveform shaping circuit 22, where it is converted to a reproduced digital signal L (see FIG. 1(b)) as a binary coded digital signal of "High" or "Low". The reproduced digital signal L is inputted to the pre-recorded area detection circuit 24. When a pulse exists in the reproduced digital signal L, the pre-recorded area detection circuit 24 turns the pre-recorded area detecting signal G (see (c) in FIG. 1) to "High" and keeps it for $\tau$ seconds. Since the pre-recorded area detection circuit 24 includes the re-triggerable pulse generation circuit 23, when the next pulse is inputted within the $\tau$ seconds after the preceding pulse was inputted in the reproduced digital signal L, the pre-recorded area detecting signal G is kept "High" for the succeeding $\tau$ seconds.

Figure 6:
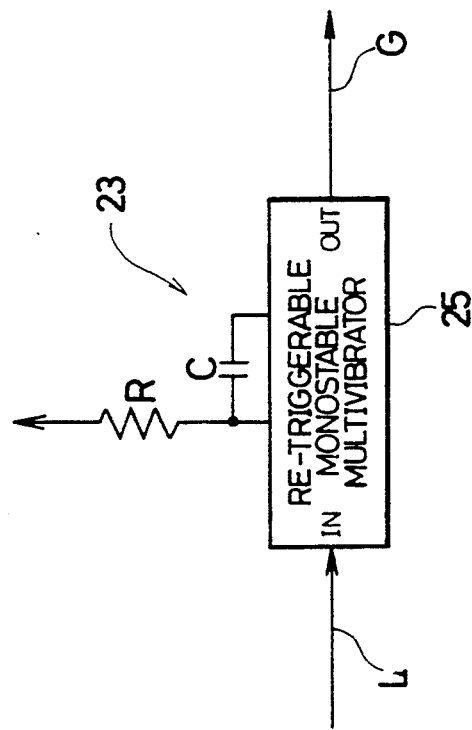

One example of an arrangement of the re-triggerable pulse generation circuit 23 is shown in FIG. 6. Here, the re-triggerable pulse generation circuit 23 includes a re-triggerable monostable multivibrator 25. The period of time $\tau$ for keeping the pre-recorded area detecting signal G high is predeterminately set by a resistor R and a capacitor C. Concretely, $\tau$ is directly proportional to the product R·C.

Figure 7:
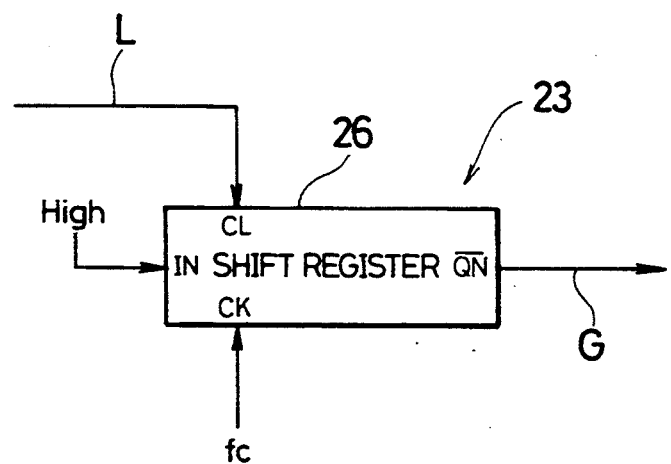
Figure 8:
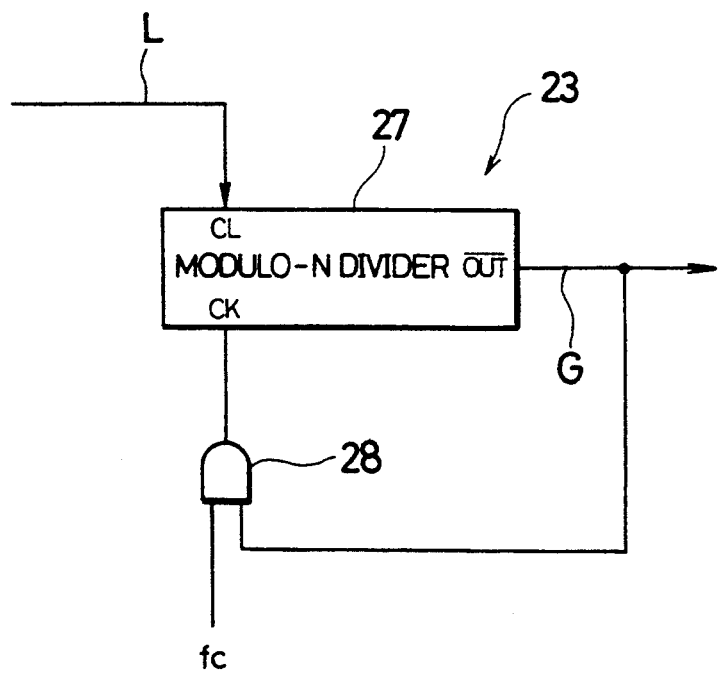

FIG. 7 shows another example of an arrangement of the re-triggerable pulse generation circuit 23 wherein a shift register 26 is employed. Serial input to an input terminal IN is given as "High" and clock pulses having a frequency $f_c$ are entered to a clock terminal CK, and then a N-th output of a shift output terminal $\overline{QN}$ is released as a pre-recorded area detecting signal G. Further, a reproduced digital signal L is inputted to a clear terminal CL. In that case, the equation is expressed as: $\tau = N \times (1/f_c)$ FIG. 8 shows the other example of an arrangement of the re-triggerable pulse generation circuit 23 wherein a modulo-N divider 27 is employed. The reproduced digital signal L is entered to a clear terminal CL, and an output of an output terminal $\overline{OUT}$ is released as a pre-recorded area detecting signal G. The pre-recorded area detecting signal G is also inputted to one of the input terminals of an AND circuit 28. Further, clock pulses having a frequency $f_c$ are entered to the other of the input terminals of the AND circuit 28, and an output signal of the AND circuit 28 is inputted to a clock terminal CK of the modulo-N divider 27. In that case, the equation is also expressed as: $\tau = N \times (1/f_c)$ As shown in FIG. 1(a) to (c), there exist a group of pulses derived from the marks 15 formed in pits in a reproduced analog signal K from the pre-format section 13 on the magneto-optical disk 10. The group of pulses are converted to binary coded signals in the waveform shaping circuit 22, which form a reproduced digital signal L. As a method for converting them to binary coded signals, amplitude detection, peak detection or other method is used. In the pre-recorded area detection circuit 24, when a pulse is inputted in the reproduced digital signal L, the period of time $\tau$ for which the pre-recorded area detecting signal G is kept "High" is preset so as to be more than a maximum pulse period $T_{max}$ in the group of pulses in the reproduced digital signal L. As a result, the pre-recorded area detecting signal G as an output signal of the pre-recorded area detection circuit 24 has a form shown in FIG. 1(c), forming a signal having a portion thereof substantially equal to the pre-format section 13 having a group of pulses in the reproduced analog signal K.

Figure 9:
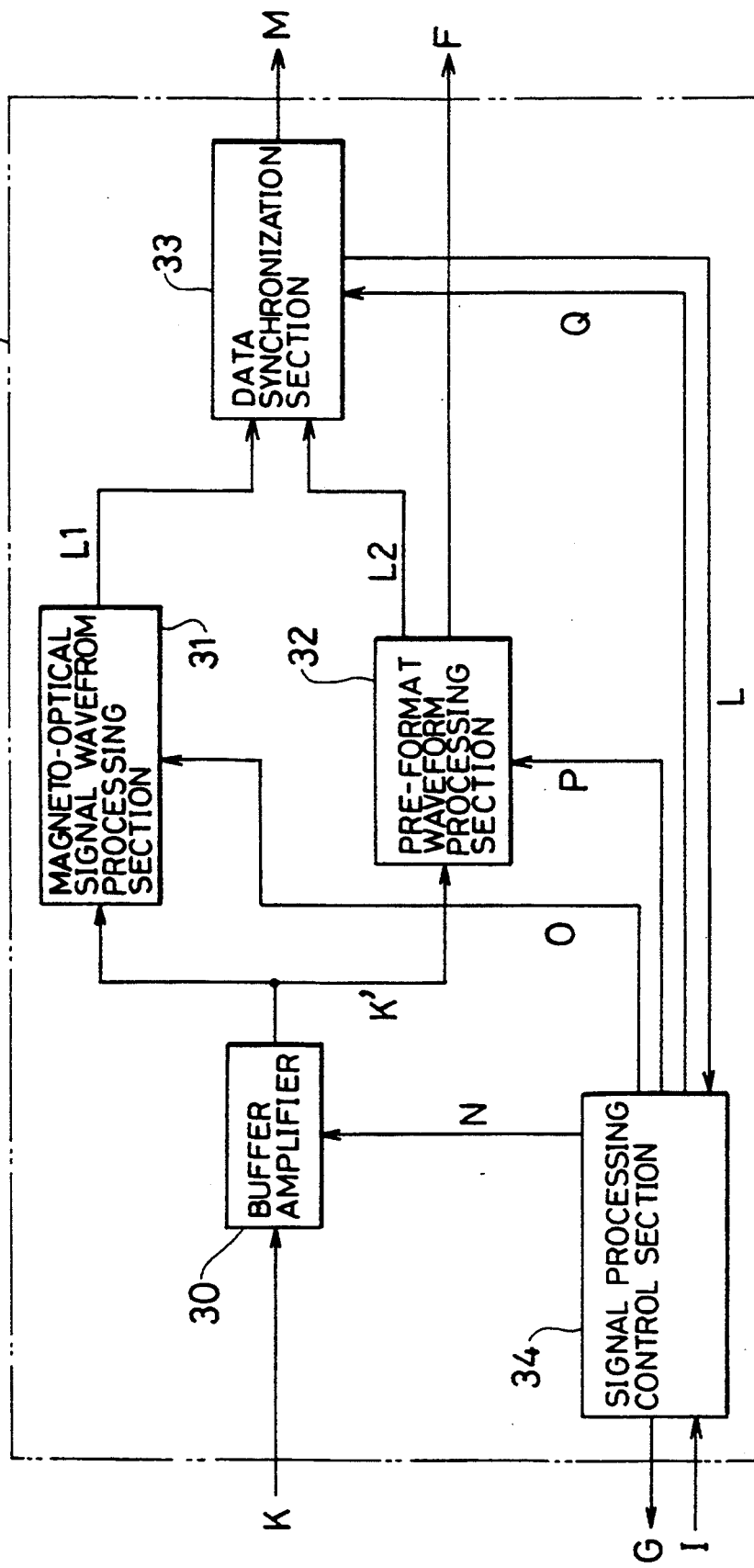

The following description will discuss a detailed example of an arrangement of the information reproducing circuit 17 referring to FIG. 9.

The reproduced analog signal K reproduced from the magneto-optical disk 10 is inputted to a buffer amplifier 30 in the information reproducing circuit 17. A reproduced analog signal K' amplified by the buffer amplifier 30 is inputted to both a magneto-optical signal waveform processing section 31 and a pre-format waveform processing section 32. The magneto-optical signal waveform processing section 31 and the pre-format waveform processing section 32 are respectively designed by the use of the aforementioned waveform shaping circuit 22 (see FIG. 5). From the magneto-optical signal waveform processing section 31 and the pre-format waveform processing section 32, are respectively released reproduced digital signals L1 and L2 as binary coded signals, which correspond to marks 16, 15 and non-marks in between in the respective magneto-optical signal section 14 and pre-format section 13.

The reproduced digital signals L1, L2 are inputted to a data synchronization section 33, where according to a PLL (Phase Locked Loop) therein, synchronous data M synchronizing to clock pulses is released and sent to a demodulation circuit, which is not shown in figures. Moreover, a sector mark signal F is generated according to the sector mark section 13a in the pre-format waveform processing section 32, and is sent to the sector timing detection circuit 18 (see FIG. 4).

A signal processing control section 34 is designed to release various control and timing signals N, O, P, Q to the buffer amplifier 30, magneto-optical signal waveform processing section 31, pre-format waveform processing section 32, data synchronization section 33, or other section. Moreover, the signal processing control section 34 includes therein the aforementioned pre-recorded area detection circuit 24 (see FIG. 5), and is designed to release the pre-recorded area detecting signal G according to the reproduced digital signals L from the data synchronization section 33. Further, a reproduction timing signal I is inputted to the signal processing control section 34. As shown in FIG. 4, I is outputted from element 20.

Figure 10:
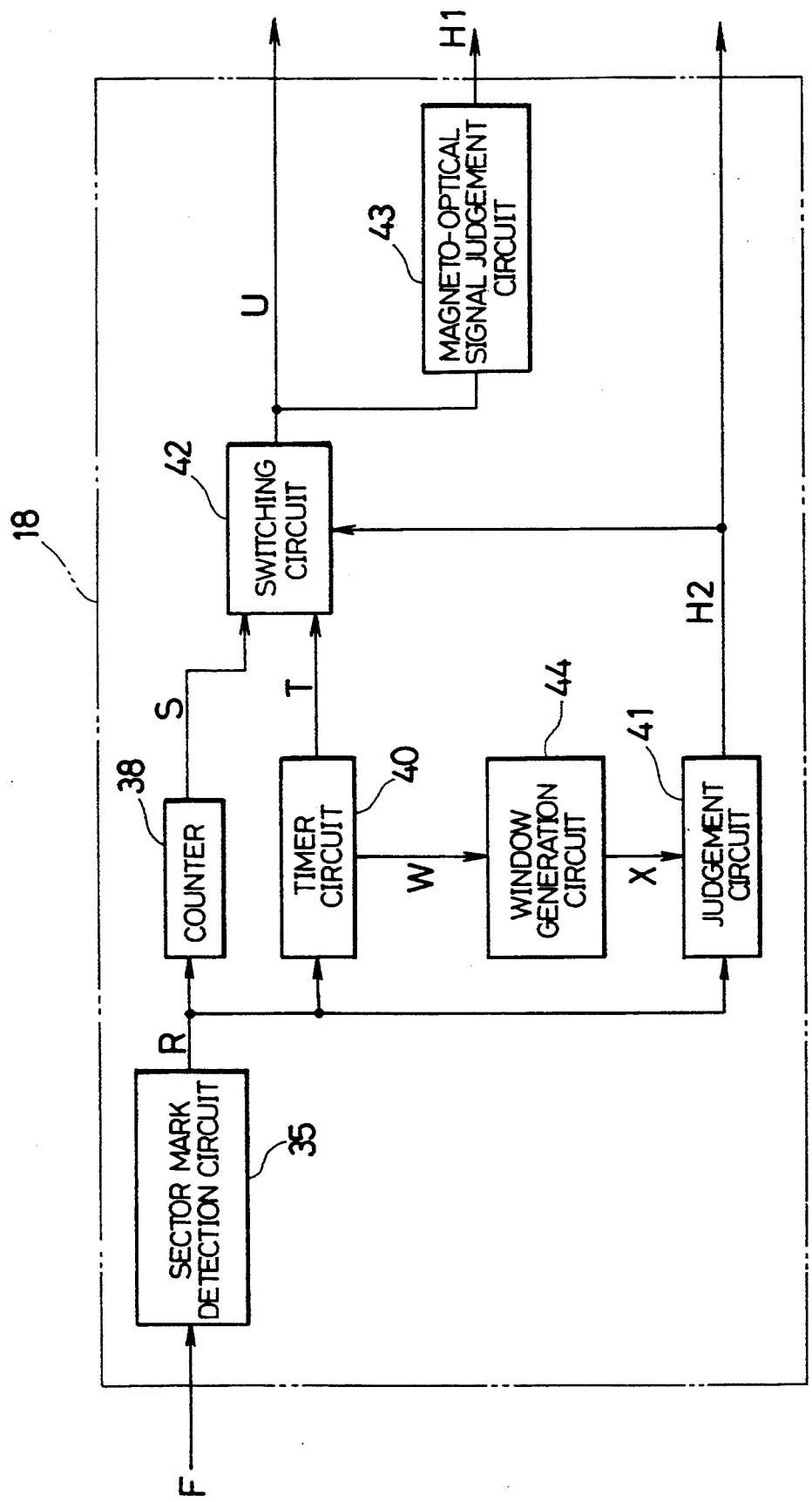
Figure 21:
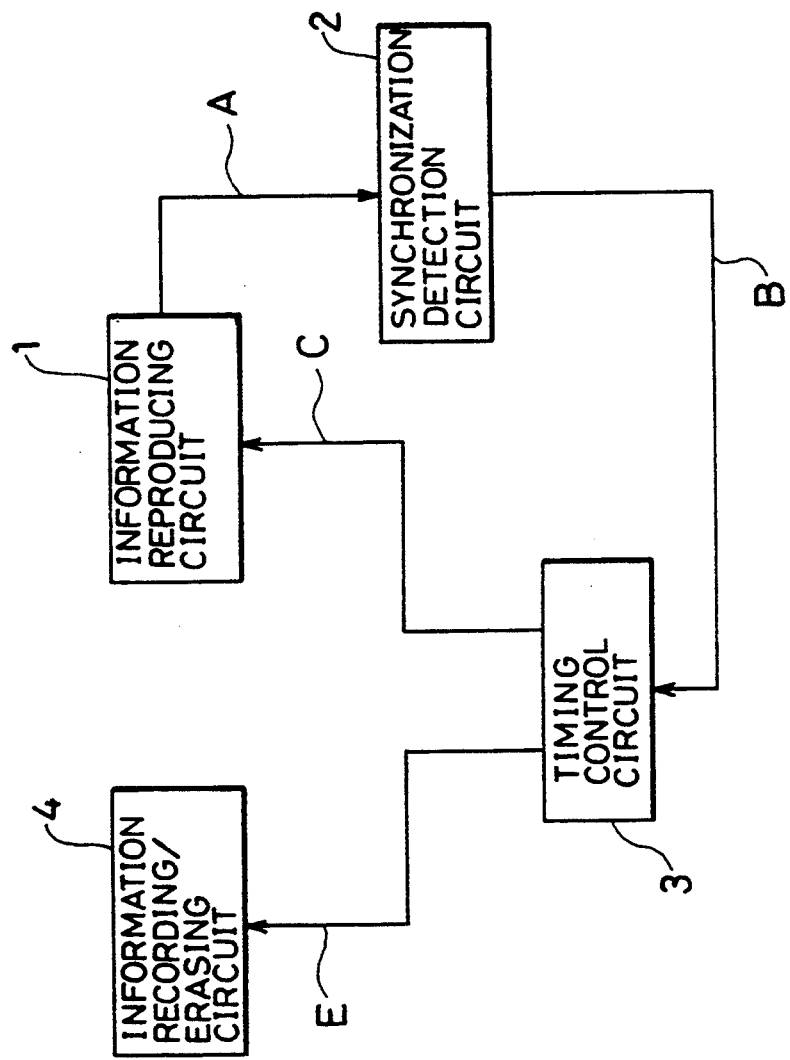
FIG. 21 is a block diagram showing a conventional information recording and reproducing device.

Next, the following description will discuss a detailed example of an arrangement of the sector timing detection circuit 18 referring to FIGS. 10 to 17. In FIG. 10, the sector mark signal F released from the information reproducing circuit 17 is inputted to a sector mark detection circuit 35 in the sector timing detection circuit 18. Detection of the sector mark section 13a is performed in the sector mark detection circuit 35.

More specifically, as shown in FIG. 11, the sector mark detection circuit 35 comprises a counter circuit 36 having counters No. 1 to No. 9 and a judgement circuit 37, and the sector mark signal F released from the information reproducing circuit 17 is inputted to counters No. 1 to No. 9. Output signals V1 to V9 of those counters No. 1 to No. 9 are respectively inputted to the judgement circuit 37, and according to those signals, a sector mark detecting signal R is released from the judgement circuit 37.

FIG. 12 is a diagram describing the operation of the counters No. 1 to No. 9. As shown in FIG. 12(b), there are recorded marks 15 (shown in hatching for convenience) and non-marks located in between in the sector mark section 13a, as aforementioned. In this example, as shown in FIG. 12(a), the marks 15 are physically provided so that a ratio of the mark lengths to the non-mark lengths can be expressed as 5:3:3:7:3:3:3:3:5. The sector mark signal F (FIG. 12(c)) obtained by the pattern of those marks and non-marks corresponds to, for example, "0" in the mark 15, and "1" in the non-mark. When the reproduced signal of these marks 15 and non-marks is inputted to the counters No. 1 to No. 9, firstly a mark length of the leading mark 15 is counted by the counter No. 1 as shown in FIG. 12(e). When the counted number (FIG. 12(d)) is within a predetermined range corresponding to a mark length "5", the detection of the leading mark 15 is confirmed. Secondly, in the counter No. 2, the succeeding non-mark having a non-mark length "3" is detected in the same procedure. Then, the marks 15 and non-marks in the sector mark section 13a are successively detected by the counters No. 3 to No. 8, and lastly the last mark 15 having a mark length "5" is detected by the counter No. 9.

Detecting signals V1 to V9 for those nine marks 15 and non-marks are inputted to the judgement circuit 37. Then, it is judged whether those nine results of the detection conform to the pattern of the sector mark section 13a, and whether an order of each of those marks 15 and non-marks is properly followed. Consequently, only in the case where the length of each of those marks 15 and non-marks as well as the order thereof is appropriate, the sector mark detecting signal R becomes "Low", thereby showing that a sector mark has been detected.

As shown in FIG. 10, the sector mark detecting signal R is entered to a counter 38, a timer circuit 40 and a judgement circuit 41 respectively. Output signals S and T of the counter 38 and the timer circuit 40 are respectively inputted to a switching circuit 42, where either of the signals is selected according to a timing judgement signal H2 from the judgement circuit 41, which will be described later, and is released as a reference timing signal U. Further, the reference timing signal U is inputted to a magneto-optical signal section judgement circuit 43 (recording signal section judgement circuit), a first magneto-optical signal section judgement signal H1 (recording signal section judgement signal) is released, as will be described in detail hereinafter.

From the timer circuit 40, an output signal W is also inputted to a window generation circuit 44 (which will be described in detail later). An output signal X from the window generation circuit 44 is inputted to the judgement circuit 41. In the judgement circuit 41, according to the output signal X and the sector mark detecting signal R from the sector mark detection circuit 35, the timing judgement signal H2 is released, as will be described hereinafter, and the timing judgement signal H2 is sent to the switching circuit 42 and the timing control circuit 20.

According to the reference timing signal U, the first magneto-optical signal section judgement signal H1 and the timing judgement signal H2, a recording/erasing timing signal J and a reproduction timing signal I, which are shown in FIG. 4, are released from the timing control circuit 20.

FIG. 13 shows a waveform of each of those signals shown in FIG. 10. The sector mark detecting signal R (FIG. 13(b)) becomes "Low" when a sector mark section 13a of the pre-format section 13 is detected. A falling edge of the sector mark detecting signal R provides timing for synchronizing the sector 12. The counter 38 shown in FIG. 10 changes its output signal S (FIG. 13(c)) to "Low" upon reaching the predetermined count after the receipt of the rising edge.

On the other hand, the timer circuit 40 is preset so as to have more count number for one sector in addition to the count number by the counter 38. Accordingly, a falling edge of an output signal T (FIG. 13(d)) of the timer circuit 40 is substantially synchronized with the falling edge of the output signal S of the counter 38 in the next sector 12.

Moreover, based on the falling edge of the sector mark detecting signal R, an output signal X (FIG. 13(e)) of the window generation circuit 44 is preset to become "Low" with a predetermined window width at a vicinity of a falling edge of the sector mark detecting signal R in the next sector 12.

The timing judgement signal H2 (FIG. 13(f)) released from the judgement circuit 41 is preset so that it may become "High" in the presence of a falling edge of the sector mark detecting signal R when the output signal X of the window generation circuit 44 is "Low", and on the other hand, may become "Low" in the absence of a falling edge of the sector mark detecting signal R when the output signal X of the window generation circuit 44 is "Low". Accordingly, the timing judgement signal H2 functions as a signal for judging whether the detection of a sector mark section 13a is executed within a predetermined range.

In the switching circuit 42 shown in FIG. 10, the output signal S of the counter 38 is selected when a sector mark section 13a is detected, and on the other hand, the output signals T of the timer circuit 40 is selected if a sector mark section 13a is not detected. Accordingly, the reference timing signal U (FIG. 13 (g)) properly provides timing control for detecting a sector mark section 13a according to the output signal T from the timer circuit 40, even if an error occurs in detecting a sector mark section 13a.

The magneto-optical signal section judgement circuit 43 to which the reference timing signal U is inputted, and the first magneto-optical signal section judgement signal H1 thereof (FIG. 13(h)) becomes "Low" during the magneto-optical signal section 14. In other words, the first magneto-optical signal section judgement signal H1 is a signal for judging whether it is the magneto-optical signal section 14 or the pre-format section 13. The aforementioned reference timing signal U, timing judgement signal H2 and first magneto-optical signal section judgement signal H1 are sent to the timing control circuit 20.

Next, the following description will discuss a detailed example of an arrangement of the timing control circuit 20. In FIG. 14, the pre-recorded area detecting signal G is inputted to a first counter 45 in the timing control circuit 20. An output signal Y of the first counter 45 is inputted to a second counter 46. An output signal of the second counter 46 becomes "Low" during the magneto-optical signal section 14, as will be described later, and the signal forms a second magneto-optical signal section judgement signal AA (a second recording signal section judgement signal). The second magneto-optical signal section judgement signal AA is inputted to a switching circuit 47.

To the switching circuit 47, the first magneto-optical signal section judgement signal H1 and the timing judgement signal H2 as the synchronization detection signals H are also inputted, and according to the timing judgement signal H2, the first magneto-optical signal section judgement signal H1 and the second magneto-optical signal section judgement signal AA are interchangeably switched to form the reproduction timing signal I, which is released therefrom to be entered to the information reproducing circuit 17.

As shown in FIG. 15(b), the pre-recorded area detecting signal G to be inputted to the first counter 45 becomes "High" during the pre-format section 13, as aforementioned according to FIG. 1 and remains high during part of 14(b), and the rising edge is substantially synchronized with the start position of the pre-format section 13. It is pre-designed that when the pre-recorded area detecting signal G has been successively "High" for not less than a predetermined byte length (for example, seventeen bytes), the output signal Y of the first counter 45 changes from "Low" to "High", as shown in FIG. 15(c). In other words, in the first counter 45, judgement of whether it is a preformat section 13 or not is made according to a byte length of the pre-recorded area detecting signal G.

Based on a rising edge of the output signal Y of the first counter 45, the second counter 46 is operated as shown in FIG. 15(d). Further, it is preset that the second magneto-optical signal section judgement signal AA as an output signal from the second counter 46 changes from "High" to "Low" in the vicinity of a border between a pre-format section 13 and a magneto-optical signal section 14 (for example, at the gap section 14b in FIG. 15(a)). It is also preset that the second magneto-optical signal section judgement signal AA returns from "Low" to "High" again in the vicinity of the next border between the magneto-optical signal section 14 and a pre-format section 13 (for example, at the gap section 14c in the FIG. 15(a)). Therefore, the second magneto-optical signal section judgement signal AA functions as a timing signal which is formed according to the pre-recorded area detecting signal G.

Additionally, in the timing control circuit 20, monostable multivibrators may be respectively used instead of the first and second counters 45, 46.

A detailed example of an arrangement of the switching circuit 47 is shown in FIG. 16. The first magneto-optical signal section judgement signal (first recording signal section judgment signal) H1 as the synchronization detection signal H is inputted to a clock input terminal CK of a flip-flop 50 (which is, for example, 74LS74 of U.S. Texas Instrument Co., Ltd.) through an inverter 48 (first inverter) in the switching circuit 47. On the other hand, the timing judgement signal H2, as it is, is inputted to a data input terminal D of the flip-flop 50. An output signal BB from an output terminal Q (positive phase output terminal) is inputted to both of terminals of a NAND circuit 51 (second inverter), while an output signal CC of an output terminal Q (negative phase output terminal) is inputted to one of input terminals of a NAND circuit 52 (first NAND circuit). Furthermore, the second magneto-optical signal section judgement signal (second recording signal section judgement signal) AA is inputted to the other of the input terminals of the NAND circuit 52. Output signals DD, EE from the respective NAND circuits 51, 52 are inputted to a NAND circuit 53 (second NAND circuit), and an output signal of the NAND circuit 53 forms the reproduction timing signal I.

FIG. 17 shows waveforms of the respective signals in FIG. 16. The first magneto-optical signal section judgement signal H1 (FIG. 17(c)) and the second magneto-optical signal section judgement signal AA (FIG. 17(e)) become "Low" during a magneto-optical section 14 (see FIG. 17(a)). Upon receiving the timing judgement signal H2 (FIG. 17(b)) at a falling edge of the first magneto-optical signal section judgement signal H1, the output signal BB (FIG. 17(d)) from the output terminal Q of the flip-flop 50 is obtained. When the output signal BB is "High" as shown in a solid line, detection of a sector mark section 13a is executed normally; however, when it is "Low" as shown in a dotted line, occurrence of an error is confirmed. Further, a circuit shown in FIG. 16 is designed so that as the reproduction timing signal I, the first magneto-optical signal section judgement signal H1 is released when the output signal BB from the output terminal Q of the flip-flop 50 is "High", while the second magneto-optical signal section judgement signal AA is released when the output signal BB is "Low". Accordingly, even if an error occurs in detecting sector mark sections 13a, timing control may be compensated based on the pre-recorded area detecting signal G.

The reproduction timing signal I provides, for example, the following control operations.

First, the reproduction timing signal I can be used for switching an input signal to the PLL of the data synchronization section 33 shown in FIG. 9. More specifically, in the case of using the magneto-optical disk 10, as shown in FIG. 2, it is necessary to properly switch between the reproduced signals L1 and L2 before being inputted to the PLL in the data synchronization section 33, since the marks 15 and marks 16 in the reproduced analog signals K' are separately processed in their waveforms in the respective pre-format waveform processing section 32 and magneto-optical signal waveform processing section 31.

Secondly, the reproduction timing signal I can be used for judging whether signals of the magneto-optical signal section 14 are demodulated or those of address information of the pre-format section 13 are demodulated in a demodulating operation of a demodulation circuit, which is not shown in the figures, installed in a step after the data synchronization section 33.

Lastly, in the case of occurrence of an error in reproduction, it is necessary to detect it and release the information about it, and therefore, the reproduction timing signal I is used for judging whether the error in reproduction has occurred in the magneto-optical signal section 14 or it has occurred in the pre-format section 13. In all those three examples, the reproduction timing signal I is used for judging whether the signals are from the magneto-optical signal section 14 or from the pre-format section 13.

The pre-recorded area detecting signal G not only compensates the timing control which is operated by detecting the sector mark section 13a within the pre-format section 13 but also is utilized in the following cases.

More specifically, the signal can be used as a reed gate signal for the PLL in the data synchronization section 33. Further, in order to provide timing control for AGC (Automatic Gain Control), the signal is used for turning on the AGC only in the areas having data recorded and for holding it in the other areas. Furthermore, the signal is used for detecting burst errors of recording signals. In all the above three examples, the pre-recorded area detecting signal G is used for judging whether an area has information recorded therein or not, in the magneto-optical signal section 14 or in the pre-format section 13. Accordingly, the pre-recorded area detecting signal G, which is used in the above cases, is applicable not only to the pre-format section 13 which is the pre-recorded section but also to the magneto-optical signal section 14 wherein information recording, reproducing and erasing operations are performed.

The following description will discuss the second embodiment of the present invention referring to FIGS. 18 to 20.

The second embodiment deals with the case where a defect pulse such as shown by a dotted line s or t in FIG. 1(a) occurs at a section other than the pre-format section 13 in the magneto-optical disk 10, and gives proper measures to prevent occurrence of an error in information reproduction due to malfunction that the pre-recorded area detecting signal G becomes "High" erroneously, as shown by a dotted line u or v in FIG. 1(c), according to the defect pulse.

More specifically, the pre-recorded area detection circuit 24 included in the information reproducing circuit 17 comprises a re-triggerable pulse generation circuit 54 and a leading pulse removing circuit 55, as shown in FIG. 18. The leading pulse removing circuit 55 functions as a circuit for nullifying the output of the re-triggerable pulse generation circuit 54 for one or more leading pulses the number of which is given by integer M in the reproduced digital signal L.

A concrete example of an arrangement of the leading pulse removing circuit 55 is shown in FIG. 19. Here, a modulo-M counter 56 is disposed as the leading pulse removing circuit 55 in a step before the re-triggerable pulse generation circuit 54, and the modulo-M counter 56 removes the leading pulses the number of which is given by integer M from the reproduced digital signal L. Additionally, instead of the modulo-M counter 56, M-shift register may be used.

FIG. 20 shows another example of the arrangement of the leading pulse removing circuit 55, where a shift register 57 is disposed as the leading pulse removing circuit 55 at a step after the re-triggerable pulse generation circuit 54, and an output of the pulse generation circuit 54 is inputted to a clear terminal $\overline{CL}$ of the shift register 57, while the reproduced digital signal L is inputted to a clock terminal CK of the sift register 57, thereby releasing an M-th shifted output QM as a pre-recorded area detecting signal G'.

The following description will discuss, for example, timing control of a case where M=1, that is to say, the output of the re-triggerable pulse generation circuit 55 is nullified only for one leading pulse of the reproduced digital signal L.

As shown in FIG. 1(a), if there is only one defect pulse within an un-recorded area of information, the defect pulse is nullified by the leading pulse removing circuit 55, and therefore there occurs no such case wherein the pre-recorded area detecting signal G' becomes "High" due to the defect pulse, as shown in FIG. 1(d).

Moreover, in the pre-format section 13, the timing of the pre-recorded area detecting signal G' to be "High" delays only by one pulse; however, for example, reed gate timing for the PLL is not affected by the delay of such a few pulses. Thus, reliability for the action of the PLL is not adversely affected.

In addition, in the above embodiment, a device is taken as an example, wherein information recording, reproducing and erasing operations are performed on and from the magneto-optical disk 10; however, the present invention is applicable to other devices for only reproducing from various optical memory devices or to those of DRAW (Direct Read After Write) type. Further, the present invention is applicable to information recording and reproducing devices wherein magnetic memory devices having a group of information pulses for indicating recorded areas are used as well as those devices wherein optical memory devices are used.

As aforementioned, the information recording and reproducing device of the present invention, which records and reproduces information on and from an optical memory device, comprises a pre-recorded area detection circuit for detecting a pre-recorded area having information predeterminately recorded and located on the memory device, and timing control means for providing timing control of an information recording or reproducing operation according to a pre-recorded area detecting signal released from the pre-recorded area detection circuit. With the arrangement, since the timing control of information recording, reproducing and erasing operations is provided according to the pre-recorded area detecting signal, timing of recording, reproducing, or erasing operation is accurately determined. Additionally, the timing control may be performed according to both of the pre-recorded area detecting signal of the present invention and the conventional synchronization detection signal. In that case, if an error should occur in the synchronization detection signal, since the pre-recorded area detecting signal is released every time pre-recorded information for a sector mark or the like is reproduced, an accurate timing control without time lag is achieved according to the pre-recorded area detecting signals.

The invention being thus described, it may be obvious that the same may be varies in many ways. Such variations are not to be regarded as a departure from the scope of the invention.

There are described above novel features which the skilled man will appreciate give rise to advantages. These are each independent aspects of the invention to be covered by the present application, irrespective of whether or not they are included within the scope of the following claims.

What is claimed is:

1. An information recording and reproducing apparatus for recording and reproducing information from a memory device having a plurality of pre-recorded areas, each pre-recorded area having pre-recorded marks, comprising:
   recording means for recording the information on the memory device;
   reproducing means for reproducing the information from the memory device;
   re-triggerable pulse generating means for detecting each pre-recorded area in accordance with the transitions of the reproduced signal from said reproducing means; and
   waveform shaping means for shaping a waveform of the reproduced signal from said reproducing means so as to convert into a binary reproduced signal, the binary reproduced signal being inputted to said re-triggerable pulse generating means;
   wherein said re-triggerable pulse generating means comprises:
   a divider having a clear input terminal, a clock input terminal and an output terminal, which receives the reproduced digital signal through the clear input terminal thereof; and
   an AND circuit having one of its input terminals connected to the output terminal of said divider, another of its input terminals connected to a reference clock signal for dividing operation and its output connected to the clock input terminal.

2. An information recording and reproducing apparatus for recording and reproducing information from a memory device having a plurality of pre-recorded areas, each pre-recorded area having pre-recorded marks, comprising:
   recording means for recording the information on the memory device;
   reproducing means for reproducing the information from the memory device;
   re-triggerable pulse generating means for detecting each pre-recorded area in accordance with the transitions of the reproduced signal from said reproducing means; and
   wherein said information reproducing means comprises:
   pre-format waveform processing means for generating a first reproduced digital signal corresponding to the pre-format section and for generating said sector mark signal;
   recording signal waveform processing means for generating a second reproduced digital signal corresponding to a recorded signal;
   a data synchronization section having a phase-locked loop circuit whereby the section releases data synchronized to a reference clock according to said first and second reproduced digital signals the respective waveform processing sections; and
   signal processing control means, having a pre-recorded area direction circuit, for permitting the pre-recorded area detection circuit to generate pre-recorded area detecting signal and for generating timing signals for each of the sections, thereby generating either the first reproduced digital signal or the second reproduced digital signal for data synchronization according to the timing signals.

3. An information recording and reproducing apparatus for recording and reproducing information from a memory device having a plurality of pre-recorded areas, each pre-recorded area having pre-recorded marks, comprising:

recording means for recording the information on the memory device;

reproducing means for reproducing the information from the memory device;

re-triggerable pulse generating means for detecting each pre-recorded area in accordance with the transitions of the reproduced signal from said reproducing means; and wherein said sector timing detecting means comprises:

sector mark detection means for generating a sector mark detecting signal according to the sector mark signal;

a counter for generating a negative pulse signal after having reached a predetermined count number following a falling edge of the sector mark detecting signal;

timer means for generating a negative pulse signal after having reached a count number corresponding to one sector portion in addition to the count number by the counter;

window generation means for generating a negative pulse signal having a predetermined window width in the vicinity of a falling edge of the next sector mark detecting signal based on a falling edge of a preceding sector mark detecting signal;

judgement means for generating a binary timing judgement signal of a first level when a falling edge of the sector mark detecting signal is detected during negative-pulse period of an output of said window generation means and for generating a binary timing judgement signal of a second level when a falling edge of the sector mark detecting signal is not detected during a negative-pulse period of an output of said window generation means;

switching means for selecting an output of said counter as a reference timing signal when the timing judgement signal is said first level and for selecting an output of said timer circuit as a reference timing signal when the timing judgement signal is said second level; and recording signal section judgement means for generating a first recording signal section judgement signal as a negative pulse signal during a period corresponding to a recorded section within one sector according to the reference timing signal, thereby permitting the reference timing signal, timing judgement signal, and recording signal section judgement signal to be sent to said timing control means.

4. The information recording and reproducing device as set forth in claim 3, wherein the sector mark detection means comprises:

a plurality of counters for successively counting count numbers, each directly proportional to each length of marks and non-marks according to the sector mark signal and generating the results as a detecting signal; and judgement circuit means for judging whether the detecting signal coincides with each predetermined length of marks and non-marks in the sector mark section and whether the order thereof is properly followed.

5. The information recording and reproducing device as set forth in claim 3, wherein said timing control means comprises:

a first counter for generating a positive pulse by counting a period during which the pre-recorded area detecting signal is a first level;

a second counter for starting a counting operation synchronized to a rising edge of the positive pulse of the first counter and for generating a second recording signal section judgement signal which is a second level in a vicinity of a border between a pre-format section and a recording signal section and is a first level in a vicinity of a next border between a recording signal section and a pre-format section; and switching circuit means for interchangeably switching the second recording signal section judgement signal of the second counter and the first recording signal section judgement signal of the recording signal section judgement circuit and releasing a signal as a reproduction timing signal.

6. The information recording and reproducing device as set forth in claim 5, wherein said switching circuit means comprises:

a D-type flip-flop including a data input terminal, a clock input terminal, a positive phase output terminal and a negative phase output terminal, and having the timing judgement signal inputted to a data input terminal thereof;

a first inverter for reversing a polarity of the first recording signal section judgement signal and for releasing the reversed first recording signal section judgement signal to the clock input terminal of the D-type flip-flop;

a second inverter for reversing a polarity of a signal released from the positive phase output terminal of the D-type flip-flop;

a first NAND circuit which receives a signal from the negative phase output terminal of the D-type flip-flop and the second recording signal section judgement signal from the second counter; and a second NAND circuit which receives the outputs of the second inverter and the first NAND circuit to execute NAND operations and for generating the reproduction timing signal, thereby permitting the first recording signal section judgement signal to be released as the reproducing timing signal when the signal from the positive phase output terminal of the D-type flip-flop is a first level and permitting the second recording signal section judgement signal to be released as the reproducing timing signal when the signal from the positive phase output terminal of the D-type flip-flop is a second level.

7. An information recording and reproducing apparatus for recording and reproducing information from a memory device having a plurality of pre-recorded areas, each pre-recorded area having pre-recorded marks, comprising:

recording means for recording the information on the memory device;

reproducing means for reproducing the information from the memory device;

re-triggerable pulse generating means for detecting each pre-recorded area in accordance with the transitions of the produced signal from said reproducing means; and waveform shaping means for shaping a waveform of the reproduced signal from said reproducing means so as to convert into a binary reproduced signal, the binary reproduced signal being inputted to said re-triggerable pulse generating means wherein said pre-recorded areas detection means further comprises:

leading pulse removing means for nullifying an output of said re-triggerable pulse generation circuit with respect to a predetermined number of leading pulses in the reproduced digital signal, thereby permitting the pre-recorded area detection signal to be detected accurately even if there is contained at least one defected pulse in the reproduced digital signal.

8. The information recording and reproducing device as set forth in claim 7, wherein said leading pulse removing circuit comprises a modulo-N counter for nullifying the output of said re-triggerable pulse generation circuit with respect to leading pulses the number of which is given by N in the reproduced digital signal.

9. The information recording and reproducing device as set forth in claim 7, wherein said leading pulse removing means is a shift register.

* * * * *